United States Patent
Pandey et al.

(10) Patent No.: US 8,982,785 B2
(45) Date of Patent: Mar. 17, 2015

(54) ACCESS POINT ASSISTED DIRECT CLIENT DISCOVERY

(75) Inventors: Santosh Pandey, Santa Clara, CA (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 13/227,624

(22) Filed: Sep. 8, 2011

(65) Prior Publication Data

US 2013/0064175 A1 Mar. 14, 2013

(51) Int. Cl.
| | | |
|---|---|---|
| H04W 4/00 | (2009.01) | |
| H04W 8/00 | (2009.01) | |
| H04W 84/18 | (2009.01) | |

(52) U.S. Cl.
CPC ............. H04W 8/005 (2013.01); *H04W 84/18* (2013.01)
USPC ........................................................ 370/328

(58) Field of Classification Search
None
See application file for complete search history.

(56) References Cited

U.S. PATENT DOCUMENTS

| | | | |
|---|---|---|---|
| 2004/0162871 A1 | 8/2004 | Pabla et al. | |
| 2004/0236850 A1* | 11/2004 | Krumm et al. | 709/224 |
| 2005/0036469 A1* | 2/2005 | Wentink | 370/338 |
| 2005/0130634 A1* | 6/2005 | Godfrey | 455/414.1 |
| 2006/0035682 A1* | 2/2006 | Karaoguz et al. | 455/574 |
| 2007/0171910 A1* | 7/2007 | Kumar | 370/392 |
| 2008/0032727 A1* | 2/2008 | Stephenson et al. | 455/513 |
| 2009/0240794 A1 | 9/2009 | Liu et al. | |
| 2009/0316669 A1* | 12/2009 | Javaid et al. | 370/338 |
| 2011/0182207 A1* | 7/2011 | Naito et al. | 370/254 |
| 2011/0294502 A1* | 12/2011 | Oerton | 455/426.1 |

FOREIGN PATENT DOCUMENTS

| | | | | |
|---|---|---|---|---|
| CA | 2780669 | * | 5/2011 | ............ H04W 48/16 |
| CA | 2780669 A1 | * | 5/2011 | |

OTHER PUBLICATIONS

Verma et al ( Canadian Pat No. CA 2780669 published on May 26, 2011).*
WiFi Alliance® ("Wi-Fi Certified Wi-Fi Direct" published on Oct. 2010) pp. 7-9.*
WiFi Alliance® Technical Committee P2P Task Group (Wi-Fi Peer-to-Peer (P2P)Section 3.1 and 3.3.3.*
Verma et al, Patent No. CA 2780669, published May 26, 2011, (same as document N).*
WiFi Alliance Technical Committee, Wi-Fi Peer-to-Peer (P2P) Technical Specification Version, publically available Oct. 4, 2010 1.1 159 pages.*

(Continued)

*Primary Examiner* — Andrew Lai
*Assistant Examiner* — Mario Malcolm
(74) *Attorney, Agent, or Firm* — Edell, Shapiro & Finnan, LLC (57) ABSTRACT

A wireless access point device configured to serve wireless client devices in a wireless network monitors transmissions sent by direct clients capable of forming ad hoc networks with one or more other direct clients. Profile data is stored for each detected direct client. The profile data indicates device type and services of the direct client, as well as potentially other information. The wireless access point receives from a direct client a request for information concerning one or more other direct clients, and sends a response to the direct client containing information for other direct clients based on the stored profile data.

25 Claims, 7 Drawing Sheets

(56) References Cited

OTHER PUBLICATIONS

Camps-Mur et al, "Device to device communications with WiFi Direct: overview and experimentation", Wireless Communications vol. 20 Issues 3, pp. 96-104.*

International Search Report and Written Opinion in counterpart International Application No. PCT/US2012/051032, mailed Nov. 12, 2012.

Wi-Fi Alliance, Wi-Fi Alliance Technical Committee, P2P Task Group, Wi-Fi Peer-to-Peer (P2P) Technical Specification, Version 1.1, 2010, (159 pages).

Wi-Fi Alliance, Wi-Fi Certified Wi-Fi Direct™ Personal, portable Wi-Fi® technology, Oct. 2010 (14 pages).

* cited by examiner

Detected Direct Client Profile Record

Device Type

Device Name

P2P Device Address(es)

P2P Interface Address

Services Offered

P2P Group Owner's SSID and other group info (if applicable)

Time Last Heard

Location

ACCESS POINT ASSISTED DIRECT CLIENT DISCOVERY

TECHNICAL FIELD

The present disclosure relates to wireless networking.

BACKGROUND

Wireless local area networks, e.g., Wi-Fi™ networks, allow for wireless communication through a central access point in what is called "infrastructure mode" as well as direct wireless communication between wireless clients (also known as stations). One type of direct client communication, known commercially in Wi-Fi networks as Wi-Fi Direct™, allows for client devices to wirelessly connect directly to each other, making it simple and convenient to perform tasks, such as printing, sharing, syncing data and displaying data. Products that support this technology can wirelessly connect to one another without associating to a traditional home, office or hotspot wireless access point (AP). For simplicity, these direct client devices are referred to herein as "Direct Clients."

The ability for a Direct Client device to discover other Direct Client devices and the services associated with other Direct Client devices greatly impacts the utility that the Direct Client platform can offer.

DESCRIPTION OF EXAMPLE EMBODIMENTS

Overview

A wireless access point device configured to serve wireless client devices in a wireless network monitors transmissions sent by direct clients capable of forming ad hoc networks with one or more other direct clients. Profile data is stored for each detected direct client. The profile data indicates device type and services of the direct client, as well as potentially other information. The wireless access point receives from a direct client a request for information concerning one or more other direct clients, and sends a response to the direct client containing information for other direct clients based on the stored profile data.

Example Embodiments

Figure 1:
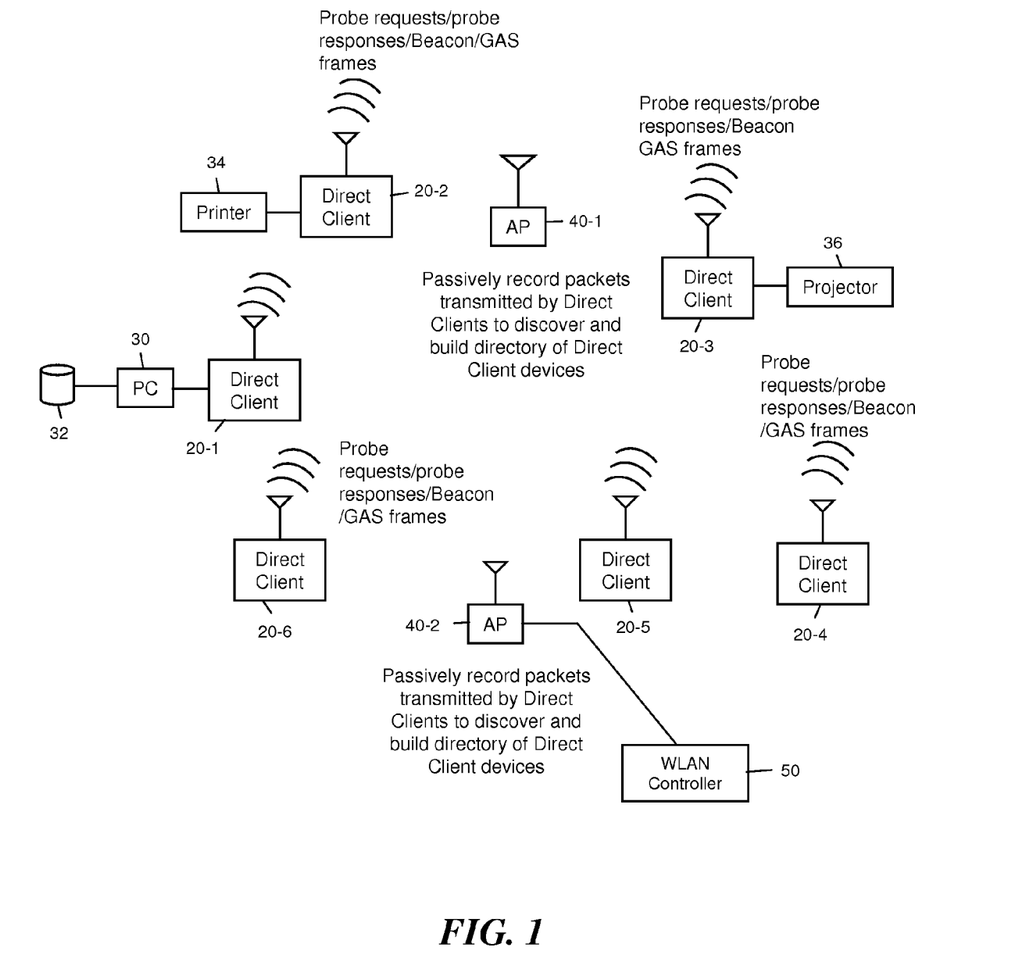
FIG. 1 is a diagram illustrating a wireless network in which wireless clients directly communicate with each other and in which one or more wireless access points are configured to discover capabilities of Direct Clients.

Referring first to FIG. 1, a diagram is shown in which a wireless network 10, such as a wireless local area network (WLAN), is deployed. In one example, the devices in the WLAN are configured to operate in accordance with the IEEE 802.11 wireless communication technology, known commercially as Wi-Fi™. In conventional WLAN deployments, there are one or more wireless access points (APs) that serve wireless client devices, also known as stations or clients. In a conventional configuration, the clients wirelessly communicate with an AP and not directly with each other.

Improvements to the IEEE 802.11 standard have been developed to allow for clients to wirelessly communicate directly with each other for certain services, functions or features. One direct connection capability is known commercially as "Wi-Fi Direct". Examples of clients configured for this direct connect feature are shown at reference numerals 20-1, 20-2, 20-3, 20-4, 20-5 and 20-6, and are referred to herein as "Direct Clients".

In the example of FIG. 1, Direct Client 20-1 is coupled to a personal computer (PC) 30 which is in turn coupled to a data storage device 32. Thus, Direct Client 20-1 can offer to other peer Direct Clients access to data on the data storage device 32. Direct Client 20-2 is coupled to a printer 34 and can therefore allow other peer Direct Clients to print documents via Direct Client 20-2. Direct Client 20-3 is connected to a projector 36 and can therefore allow peer Direct Clients access and use of the projector 36.

Currently, the discovery of a peer Direct Client device is carried out through a Device Discovery mechanism that involves a Direct Client scanning for other Direct Client on one or more channels. For example, in a "find" phase, the Direct Client device alternates between a Listen state in which it receives signals on each of a plurality of channels for a random period of time and a Search state in which it sends probe request frames on the channels. By randomizing the Listen and Search states, two Peer-to-Peer (P2P) Direct Client devices may discover each other.

After Device Discovery, the Direct Client device may attempt to discover services on another Direct Client using a Service Discovery mechanism. This may be performed by exchanging Generic Advertising Services (GAS) frames according to IEEE 802.11u. The IEEE 802.11 P2P Technical Specifications v1.1 set forth these various discovery mechanisms.

Many Direct Client devices are portable or mobile devices, and consequently will have limited power resources. The aforementioned Device Discovery and Service Discovery mechanisms are inefficient because they require individual Direct Client devices to consume power, and use a relatively large number of packets (including the increased probe request and response) on several channels which hinders overall throughput and channel quality on the channels. Moreover, if a peer Direct Client device is in a sleep mode, then the discovery phase is a wasted effort.

The 802.11 infrastructure network has higher "up" time than Direct Client devices. For example, APs are generally connected to a constant power supply and do not need to change channel frequently in order to main concurrent association with an infrastructure WLAN and Direct Client group. Thus, APs can scan continuously and respond to requests continuously. Accordingly, one or more APs, examples of which are shown at 40-1 and 40-2, are configured to passively record packets transmitted by Direct Client devices to discover and build a directory of Direct Client services that the APs can use to assist new Direct Client devices in finding a desired peer Direct Client device having a desired service. As shown in FIG. 1, Direct Client devices will send probe request and probe response messages, as well as Beacons and advertisement (e.g., GAS) frames. By monitoring these over-the-air transmissions, APs can learn about the presence and capabilities of Direct Clients and use that information to guide Direct Clients to other Direct Clients (e.g., new Direct Clients to existing ones or existing Direct Clients to other Direct Clients) and to alert existing Direct Clients about new Direct Clients that may be seeking their services or capabilities.

A Group may be created by a single Direct Client, particularly when connecting to legacy device (a client that is not configured for Direct Client capabilities) and may be useful when creating a Group to offer a specific service. When forming a connection between two Direct Clients, a Group may be formed automatically. The device in charge of the Group decides whether the Group is a temporary (single instance) or persistent (multiple, recurring use) Group. Persistent Groups are created by Direct Client devices storing the Group information and credentials. A Direct Client may be part of more than one Group.

A Direct Client device will consume much less power discovering an AP than it would when discovering a P2P Direct Client device. This is because the AP will almost always be available on its serving channel and will therefore respond to a probe request rapidly, e.g., within 10 ms after receiving it. Any Direct Client device may then query the AP to get the list of all the Direct Client devices in its vicinity using IEEE 802.11u GAS frames. The AP may return all the information that it has recorded. The AP may be configured to provide only some of the information based on various criteria such as location of the requesting device, credentials of the device, search criteria provided by the Direct Client device such as "looking for a printer" etc.

FIG. 1 shows a WLAN controller 50 connected to an AP, e.g., AP 40-2. The WLAN controller 50 is a computing apparatus that manages one or more APs in a WLAN. In an alternative form, the data management and reporting responsibilities of the APs, with respect to detected Direct Clients, are offloaded to the WLAN controller 50 or other computing apparatus. In general, the computing apparatus that controls the APs may be different than the computing apparatus to does the data management and reporting operations described herein.

Figure 2:
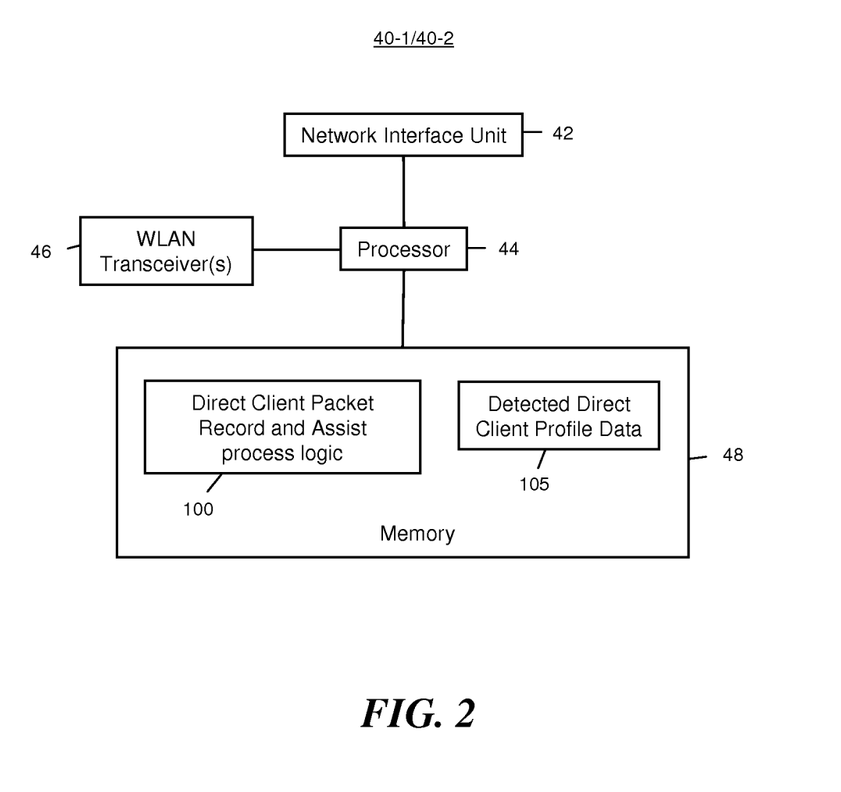
FIG. 2 is a block diagram showing an example of a wireless access point configured to discover capabilities of Direct Clients.

Reference is now made to FIG. 2 which shows an example block diagram of an AP configured to perform the Direct Client discovery and assist operations described herein. There are numerous possible configurations for an AP and FIG. 2 is meant to be an example. The AP, e.g., AP 40-1 or 40-2 from FIG. 1, comprises a network interface unit 42, a processor 44, one or more WLAN transceivers 46 and memory 48. The network interface unit 42 is, for example, an Ethernet card device that allows the AP to connect by a wired (Ethernet) network. The processor 44 is a microcontroller or microprocessor, for example, that is configured to execute software instructions stored in the memory 48. The WLAN transceiver 46 comprises one or more WLAN baseband (modem) and radio frequency (RF) chipsets to enable the AP to wirelessly communicate according to a WLAN communication standard, e.g., the IEEE 802.11 communication standard. When multiple WLAN transceivers are included, the AP can simultaneously communicate on multiple channels.

The memory 48 may comprise read only memory (ROM), random access memory (RAM), magnetic disk storage media devices, optical storage media devices, flash memory devices, electrical, optical, or other physical/tangible memory storage devices. Thus, in general, the memory 48 may comprise one or more computer readable storage media (e.g., a memory device) encoded with software comprising computer executable instructions and when the software is executed (by the processor 44) it is operable to perform the operations described herein. For example, the memory 48 stores or is encoded with instructions for Direct Client Packet Record and Assist Process Logic 100. In addition, the memory 48 stores detected Direct Client Profile Data 105.

Figure 3:
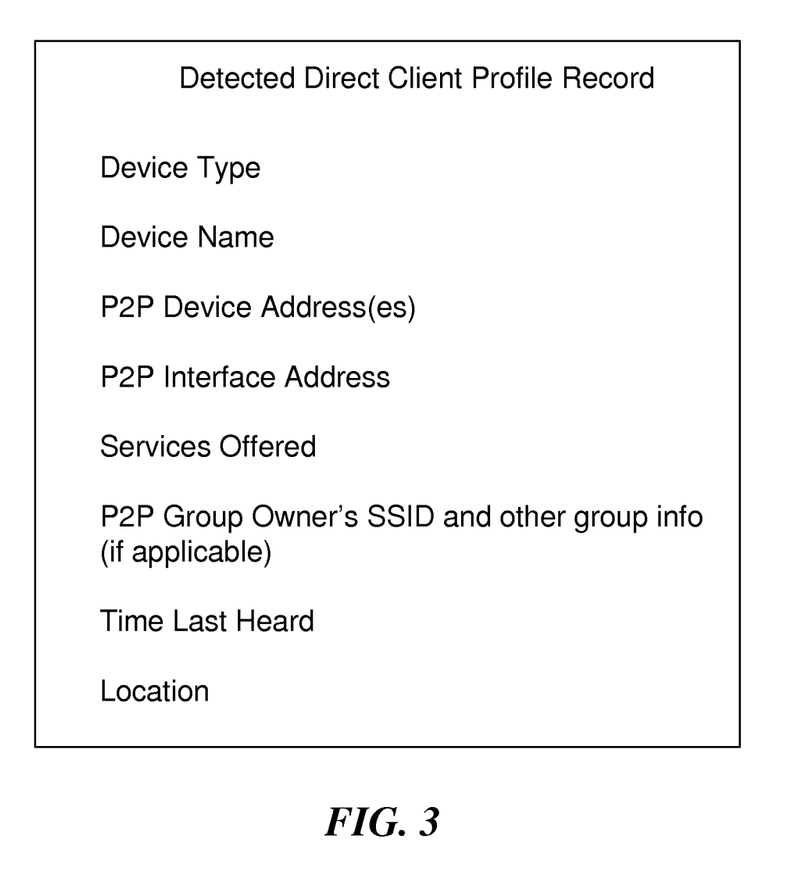
FIG. 3 is a diagram showing an example of data record stored by the wireless access point for a discovered Direct Client.

Reference is now made to FIG. 3. FIG. 3 illustrates an example of data contained in a data record for a detected Direct Client device.

Device Type is an indication of the type of Direct Client device, such as SmartPhone, PC, Laptop, etc.

Device Name is a name given to a particular Direct Client device (e.g., Bill's Phone).

A Peer-to-Peer (P2P) Device Address and its subsequent P2P Interface Address are assigned according to the rules of aforementioned P2P interface specification. These addresses are similar to media access control (MAC) addresses. A Direct Client device may have several P2P addresses so the stored profile data for a detected Direct Client device may contain more than one P2P address.

Services Offered indicates the various services of functions offered by a Direct Client device, such as printing, data storage/retrieval, etc. These services can be learned from GAS frames sent in accordance with IEEE 802.11u as described herein. The AP may cache the GAS frames detected from Direct Client devices to record the services that the Direct Client devices can offer.

When a Client Device is assigned to a Group, the Service Set Identifier (SSID) of the Group Owner of that Group may be captured, as well as any other information about that group, such as the P2P device address, channel information, Beacon interval and Timing Synchronization Function (TSF) offset of the group with respect to the AP (which is useful to accelerate subsequent discovery and scanning).

Time Last Heard is a timestamp that indicates when the AP detected a transmission by that particular Direct Client device. This indicates how current or stale the information is about this Direct Client device, and is useful to indicate how likely it is that the Direct Client device will continue to remain in range.

Location refers to a physical/geographic location of a Direct Client device if location capability is enabled in the WLAN (on multiple APs or dedicated sensor devices that can receive transmission from devices to determine their locations). A dedicated device, such as a WLAN controller or other computing apparatus, in the wireless network back-end infrastructure may estimate and store locations of devices, e.g., locations of Direct Client devices. Thus, the AP may store a Direct Client device's physical location.

Examples of still further information that may be captured and stored as profile data for detected Direct Clients include device subtype according to the Wireless Provisioning Service (WPS) protocol, parameters revealed by the service discovery protocols, e.g., Bonjour™, Universal Plug and Play (UPnP), etc.

The AP will store and update a data record containing information such as that depicted in FIG. 3 for each detected Direct Client device.

Figure 4:
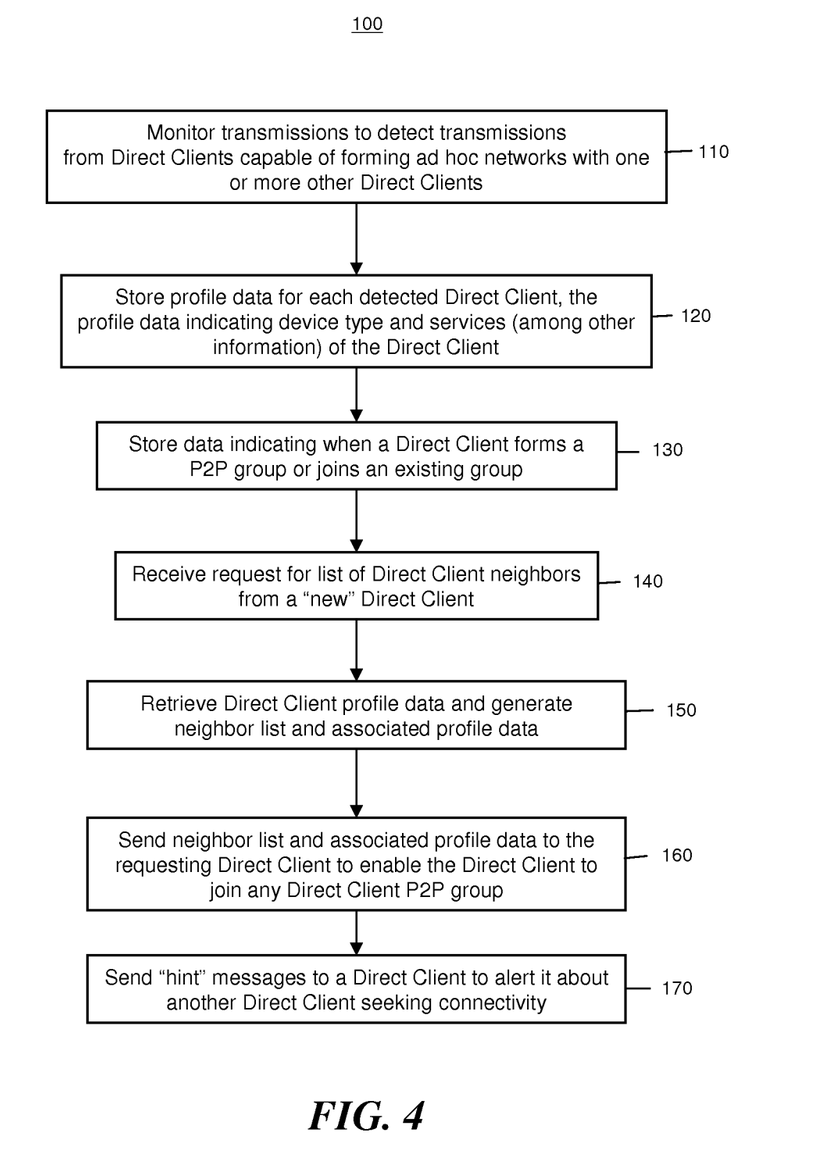
FIG. 4 is a flow chart depicting examples of operations performed by the wireless access point device in discovering Direct Clients and assisting Direct Clients in finding other Direct Clients.

Reference is now made to FIG. 4 for a description of a flow chart depicting operations of an AP configured to assist in Direct Client discovery by executing the process logic 100 referred to in connection with FIG. 3. At 110, an AP monitors over-the-air transmissions to detect transmissions sent by Direct Client devices, that is, clients that are capable of forming ad hoc (i.e., P2P) networks with one or more other Direct Client devices. Examples of such transmissions that indicate to the AP the presence and characteristics of Direct Client devices are described above. The messages that the AP monitors may include one or more of probe request messages, probe response messages, GAS messages in accordance with IEEE 802.11u, and beacon reports sent in accordance with IEEE 802.11k.

At 120, the AP stores profile data for each detected Direct Client device. The profile data indicates the device type and services as well as possible other information described above in connection with FIG. 3. Moreover, at 120, for Direct Client devices already detected, the AP will update existing profile records for Direct Clients already detected. In addition, at some point, the AP may delete an existing profile record for a Direct Client device if it determines that it has not detected a transmission from that device for a predetermined period of time, for example.

At 130, the AP or another apparatus, e.g., a WLAN controller that receives information related to the monitored transmissions from the AP, stores data indicating when a Direct Client forms a P2P group or joins an existing P2P group. This information is useful in a profile record as well, as described above in connection with FIG. 3. The AP may also help administer a locally unique P2P interface address for any P2P device. By keeping track of the P2P interface and device address, the AP or the wireless infrastructure (e.g., WLAN controllers to which the APs connect) can correctly track the P2P device as it joins different peer-to-peer groups. This is useful because when the P2P device joins a P2P group, it uses a new P2P interface address. Since most network management and client tracking programs use a MAC address to uniquely identify clients, the P2P devices will incorrectly show up as several different clients on the network. It is therefore useful to maintain records about the P2P interface address of Direct Clients to resolve any device identity ambiguities.

At 140, the AP may receive a request for information concerning detected Direct Clients that the AP may know of. For example, the request may be for a list of Direct Clients in the vicinity (e.g., neighbors) from a new Direct Client. Examples of messages/frames that Direct Clients and APs may use to transmit information to each other in the course of the AP-assisted discovery process are described hereinafter in connection with FIGS. 6-9.

At 150, the AP retrieves its stored Direct Client profile data 105 and generates a suitable response to the request, e.g., a list of Direct Client neighbors and the associated profile data for the Direct Clients. For example, the AP may compile a list and associated data indicating device type and services of at least a subset of detected Direct Clients. The list may be compiled by selecting a subset of detected Direct Clients that satisfy a particular service desired by a Direct Client and/or based on a location of the Direct Client, or relative location/distance between the Direct Client and one or more other (already-discovered) Direct Clients.

At 160, the AP sends a response message to the new Direct Client device containing information for detected Direct Clients based on the stored profile data. The list enables a new Direct Client to join any Direct Client group discovered by the AP, and may take any of the forms described herein, e.g., complete list, location-based list, service-based list, etc.

At 170, the AP may send a "hint" message to an existing Direct Client device to alert or notify it about another Direct Client device, e.g., the new Direct Client, may be seeking ad hoc network connectivity with it. The IEEE 802.11 standard provides a mechanism to assist Clients with power saving, whereby APs buffer frames for a Client when that Client is in power save (sleep) mode and to transmit them later to the Client when the AP knows the Client will be receiving. When a Client is in power save mode, it turns off its transmitter and receiver to preserve energy. It takes less power for a Client to turn its receiver on in order to receive frames than to turn on its transmitter to transmit frames. For this reason, it is more power-efficient for an AP to inform a Client if it has buffered frames present than to have the Client poll the AP to determine if frames are queued up to be sent to the Client. In this regard, the AP may buffer a request received from a new Direct Client device to connect with a particular existing (already-detected) Direct Client until the particular Direct Client is no longer in a sleep mode. Furthermore, the AP may send a message to the particular Direct Client (that is in sleep mode) to awaken it from the sleep mode in order to facilitate connection with a new/interested Direct Client so that both Direct Client devices are awake and operating on the same channel at a given time (and in this sense speed up the discovery).

For example, assume that P2P_1 is a Direct Client already in the network that is associated with an AP. This device will register its service with the AP and go to a sleep state—power save mode. If another Direct Client, called P2P_2, enters the venue and wants the service offered by Direct Client P2P_1, the AP can send a message with a Traffic Indication Map (TIM) bitmask set to wake up Direct Client P2P_1 and also send a message to Direct Client P2P_2 containing a TSF time when Direct Client P2P_1 is expected/likely to be awake and on what channel Direct Client P2P_1 will be awake. In this way, the AP can coordinate Direct Client P2P_1 and Direct Client P2P_2 to be awake and on the same channel.

The TIM bitmask is a bitmap that indicates to any sleeping listening Client if the AP has any buffered frames present for it. Because Clients should listen to at least one Beacon before the listen interval, the AP periodically sends this bitmap on its beacons as an information element. The TIM consists of 2008 bits, each bit representing the Association ID (AID) of a Client. For example, the TIM information element allows the AP to transfer one byte up to the entire 251 bytes (2008 bits) of the TIM.

Figure 5:
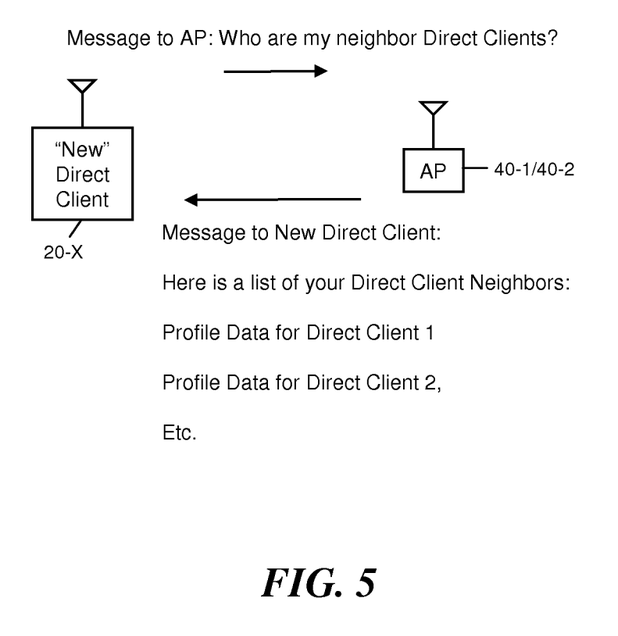
FIG. 5 is a diagram generally depicting an example of the operations performed by a wireless access point configured as depicted in FIG. 2 in discovering Direct Clients and assisting Direct Clients.

Reference is now made to FIG. 5. FIG. 5 illustrates a paradigm to depict operations of the AP-assisted Direct Client discovery techniques described herein. In this example, a "New" Direct Client device is shown at reference numeral 20-X and is a Direct Client capable device that is seeking information about other Direct Client devices in its vicinity. An AP configured with the capabilities described herein (e.g., AP 40-1/40-2 from FIG. 1) is also shown in FIG. 5. The new Direct Client 20-X sends a message to the AP to the effect of: "Who are my neighbor Direct Clients?" The AP responds with a message to the new Direct Client 20-X with a message that is generically of the form:

Here is a list of your Direct Client neighbors:
Profile Data for Direct Client 1
Profile Data for Direct Client 2
etc.

Figure 6:
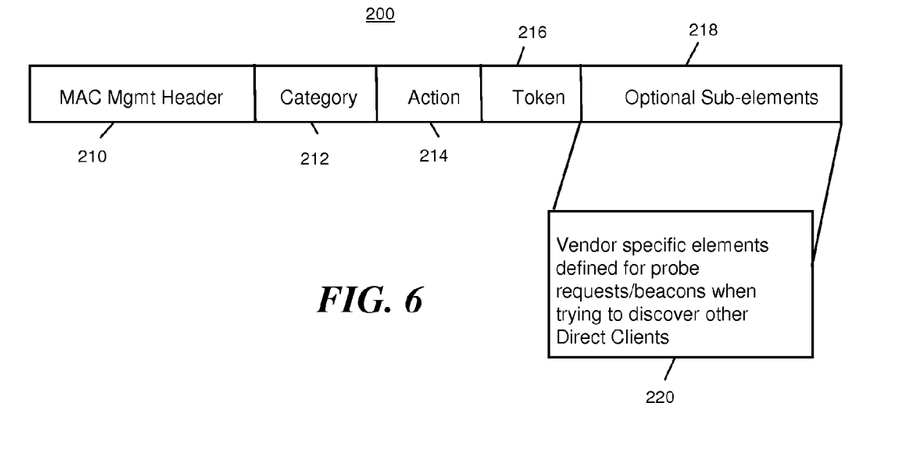
FIG. 6 is a diagram depicting an example of a neighbor report request frame that may be used by a Direct Client (already associated with the access point) to request for information about other Direct Clients discovered by the access point.
Figure 7:
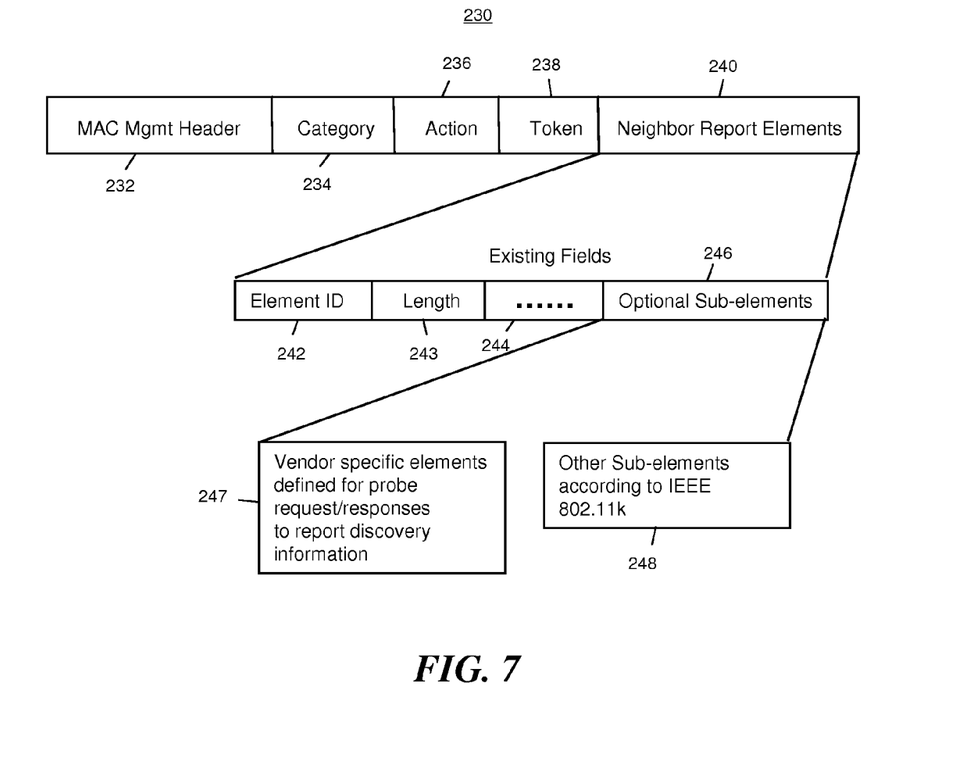
FIG. 7 is a diagram depicting an example of a neighbor response message that may be used by the access point in responding to a frame shown in FIG. 6.

Reference is now made to FIGS. 6-9 for examples of frames/messages that may be sent by Direct Client devices or APs in connection with the techniques described herein. FIGS. 6 and 7 are examples of frames that are useful when a Direct Client device is already associated with an AP, and can therefore send and receive messages according to IEEE 802.11k. FIG. 6 illustrates an example of a neighbor report request frame 200 that a new Direct Client can use to send to an AP to request information about existing Direct Clients. The neighbor report request frame 200 comprises a MAC management (Mgmt) header 210, a Category field 212, an Action field 214, a Token field 216 and an optional Sub-elements field 218. The optional Sub-elements field 218 may be used for vendor-specific elements defined by the Wi-Fi Alliance (WFA) for example, for probe requests or Beacons when attempting to discover other Direct Client devices. The vendor-specific elements are identified at reference numeral 220.

FIG. 7 illustrates an example of a neighbor report response frame 230 that an AP would send to a Direct Client device in response to a probe request frame 200 shown in FIG. 6. The response frame 230 comprises a MAC management (Mgmt) header 232 field, a Category field 234, an Action field 236, a Token field 238 and a Neighbor Report Elements field 240. The Neighbor Report Elements field 240 comprises an Element ID sub-field 242, a Length sub-field 243, one or more various existing fields shown at 244, and an optional Sub-elements sub-field 246. The optional Sub-elements sub-field 246 comprises, at 247, vendor-specific elements defined, for example by the WFA, for probe requests/responses to report discovery information and other IEEE 802.11k Sub-elements at 248, including TSF offset, and other parameters referred to above in connection with FIG. 3. Thus, an AP may use the sub-field 246 to send information such as that described above in connection with FIG. 3 with respect to Direct Client devices that it aware of.

Figure 8:
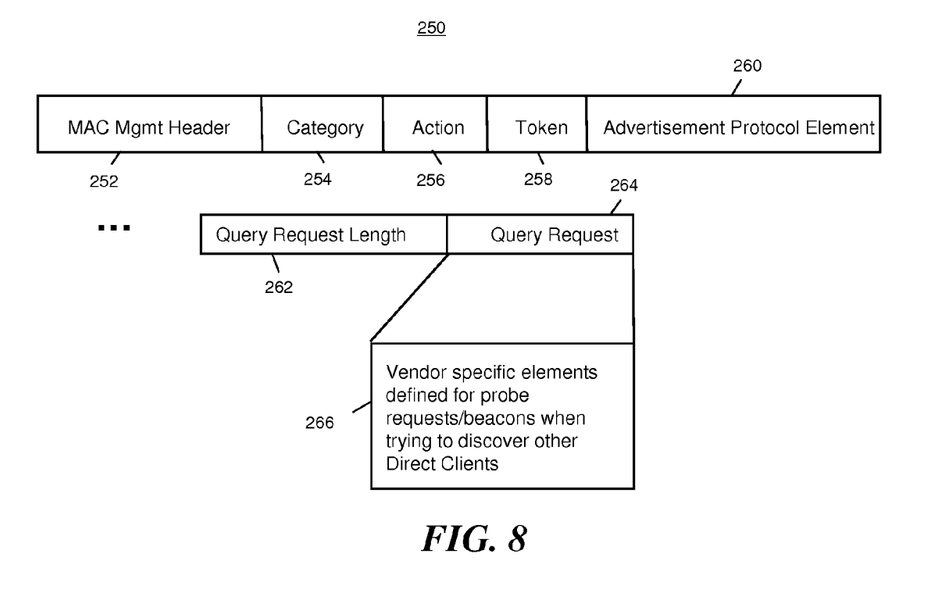
FIG. 8 is a diagram depicting an example of an advertising services request frame that may be used by a Direct Client (not yet associated with the access point) to request for information about other Direct Clients discovered by the access point.
Figure 9:
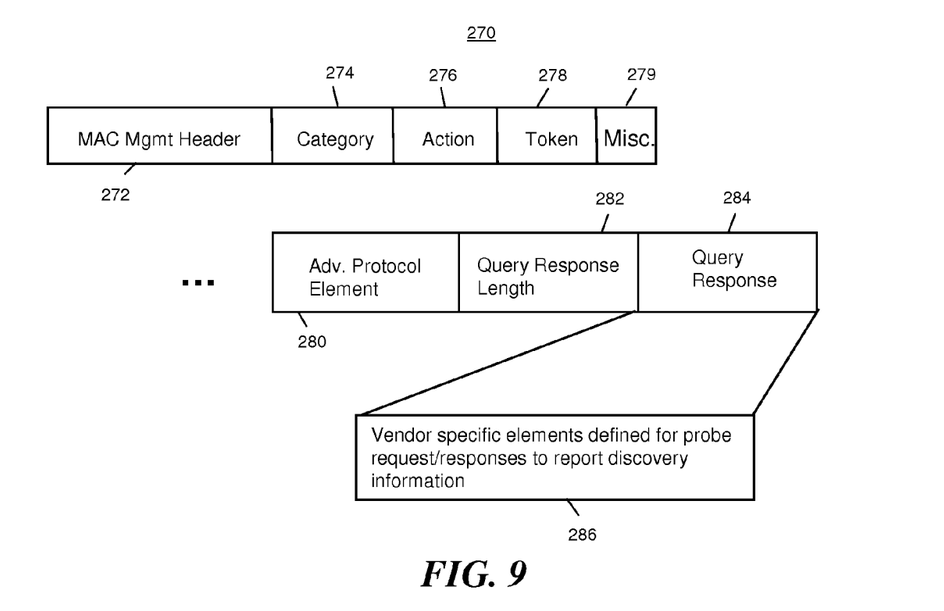
FIG. 9 is a diagram depicting an example of a response message that may be used by the access point in responding to a frame shown in FIG. 8.

Reference is now made to FIGS. 8 and 9 for a description of frames useful when a new Direct Client device that has not associated with an AP is seeking information about other Direct Client devices. FIG. 8 illustrates an example of a GAS initial request frame 250 sent by a new Direct Client device according to IEEE 802.11u, for example. The GAS initial request frame 250 comprises a MAC management (Mgmt) header 252 field, a Category field 254, an Action field 256, a Token field 258, an Advertisement Protocol Element field 260, one or more miscellaneous other fields, a Query Request Length field 262 and a Query Request field 264. The Advertisement Protocol Element field 260 comprises vendor-specific elements that indicate the services offered by a Direct Client device. The Query Request field 264 may comprise vendor-specific elements defined for probe requests/beacons when trying to discover other Direct Clients shown at 266.

An example of a GAS initial response frame 270 sent by an AP in response to the GAS initial request frame 250 is shown in FIG. 9. The GAS initial response frame 270 comprises a MAC management (Mgmt) header 272 field, a Category field 274, an Action field 276, a Token field 278, one or more miscellaneous fields 279, an Advertisement Protocol Element field 280 (similar to field 260 of request frame 250), a Query Response Length field 282 and a Query field 284. The Query field 284 comprises, as shown at 286, vendor-specific elements defined for probe request/responses to report discovery information to a Direct Client device seeking information.

In summary, techniques are provided to enable infrastructure equipment, e.g., WLAN APs, to assist Direct Client devices in discovering other Direct Client devices and services. These techniques facilitate faster discovery of Direct Client devices, help conserve power on Direct Client devices and allow the infrastructure (e.g., APs) to keep track of the Direct Client devices. For example, the APs can keep track of Direct Client devices and their multiple P2P interface addresses. This will also encourage Direct Client devices to listen to an AP and extend the APs influence on their working parameters, such as channel selection, transmit power control, etc., in turn allowing enterprise networks to better control frequency band utilization.

While the foregoing describes that the direct client discovery process is performed by an AP, this is not meant to be limiting. For example, a WLAN controller in the wireless network infrastructure or a generic server computing apparatus may perform these operations on the basis of data supplied from one or more APs that monitor transmissions from direct clients in a wireless network environment.

The above description is intended by way of example only.

What is claimed is:

1. A method comprising:
   at a wireless access point device, the wireless access point device includes a power supply, configured to serve wireless client devices in a wireless network, monitoring transmissions sent by direct clients capable of forming ad hoc networks with one or more other direct clients;
   storing profile data for each detected direct client, the profile data indicating device type, a location, and services of the direct client;
   at the wireless access point, receiving from a direct client a request for information concerning one or more other direct clients that are neighbors of the direct client from which the request is received, and for a particular service desired by the direct client;
   at the wireless access point, compiling a list and associated data indicating device type and services of the other direct clients based on the profile data, wherein the compiling includes selecting a subset of the other direct clients based on the locations of the direct client and the other direct clients stored in the profile data and whether the other direct clients offer the particular service desired by the direct client; and
   at the wireless access point: sending a response to the direct client containing information including the list of the subset of the other direct clients;
   sending a wake-up message to one of the other direct clients that provides the particular service; and
   sending a message to the direct client indicating a time when the one of the other direct clients is expected to be awake and on what channel the other direct client will be awake.

2. The method of claim 1, wherein the storing is performed at the wireless access point device.

3. The method of claim 1, wherein the storing is performed at a controller apparatus that is configured to communicate with the wireless access point device.

4. The method of claim 1, wherein the monitoring comprises monitoring messages sent by direct clients including one or more of probe request messages, probe response messages, beacon reports, and generic advertising service messages.

5. The method of claim 1, and further comprising sending from the wireless access point device to a particular direct client, the particular direct client is one of the other direct clients, a message indicating to the particular direct client that the direct client is seeking ad hoc network connectivity with the particular direct client.

6. The method of claim 1, and further comprising at the wireless access point device;
buffering a request of the direct client to connect with a particular one of the other direct clients in a sleep mode;
sending a message to the particular one of the other direct clients to awaken the particular one of the other direct clients from the sleep mode; and
sending the buffered request of the direct client to the particular one of the other direct clients when the particular one of the other direct clients has been awakened.

7. The method of claim 1, wherein the storing comprises storing a peer-to-peer interface address and a device address for a detected direct client as the detected direct client joins different peer-to-peer groups.

8. The method of claim 1, wherein receiving the request comprises receiving a message configured for use prior to association of the direct client with the wireless access point device, and wherein sending comprises sending the response configured for use prior to association of the direct client with the wireless access point device.

9. The method of claim 1, wherein receiving the request comprises receiving a message configured for use after association of the direct client with the wireless access point device, and wherein sending comprises sending the response configured for use after association of the direct client with the wireless access point device.

10. The method of claim 1, wherein:
the storing comprises storing for each detected client a peer-to-peer interface address that is not a media access control (MAC) address; and
the selecting a subset of the other direct clients further includes resolving any direct client identity ambiguities based on the corresponding stored peer-to-peer interface addresses that are not MAC addresses.

11. The method of claim 1, wherein the storing further comprises storing profile data comprising device type, device name, one or more peer-to-peer addresses, services offered, peer-to-peer group information, Timing Synchronization Function offset and time last detected.

12. The method of claim 1, further comprising deleting existing stored profile data for the direct client if transmission from the direct client has not been detected for a predetermined period of time.

13. The method of claim 12, wherein the storing comprises storing profile data comprising device type, device name, one or more peer-to-peer addresses, services offered, peer-to-peer group information, Timing Synchronization Function offset and time last detected.

14. The method of claim 1, wherein the selecting includes selecting a subset of the other direct clients based on relative locations of the direct client and the other clients.

15. An apparatus comprising:
a wireless transceiver unit configured to enable wireless communication with wireless client devices in a wireless network, including reception of transmissions sent by direct clients capable of forming ad hoc networks with one or more other direct clients;
a memory; and
a processor configured to:
monitor transmissions sent by direct clients;
store in the memory profile data for each detected direct client, the profile data indicating device type, a location, and services of the direct client;
receive from a direct client a request for information concerning one or more other direct clients that are neighbors of the direct client from which the request is received, and for a particular service desired by the direct client;
compile a list and associated data indicating device type and services of the other direct clients based on the profile data, wherein the processor is configured to compile by selecting a subset of the other direct clients based on the locations of the direct client and particular service desired by the direct client; and the other direct clients stored in the profile data and whether the other direct clients offer a
generate a response message to be sent to the direct client, the response message including information including the list of the subset of the other direct clients;
cause a wake-up message to be sent to one of the other direct clients that provides the particular service; and
cause a message to be sent to the direct client indicating a time when the one of the other direct clients is expected to be awake and on what channel the other direct client will be awake.

16. The apparatus of claim 15, wherein the processor is configured to:
buffer a request of the direct client to connect with a particular one of the other direct clients in a sleep mode;
cause a message to be sent to the particular one of the other direct clients to awaken the particular one of the other direct clients from the sleep mode; and
cause the buffered request of the direct client to be sent to the particular one of the other direct clients when the particular one of the other direct clients has been awakened.

17. The apparatus of claim 15, wherein the processor is configured to store a peer-to-peer interface address and device address for a detected direct client as it joins different peer-to-peer groups.

18. The apparatus of claim 15, wherein the processor is further configured to:
store for each detected client a peer-to-peer interface address that is not a media access control (MAC) address; and
perform the select a subset of the other direct clients by resolving any direct client identity ambiguities based on the corresponding stored peer-to-peer interface addresses that are not MAC addresses.

19. The apparatus of claim 15, wherein the processor is further configured to delete existing stored profile data for the direct client if transmission from the direct client has not been detected for a predetermined period of time.

20. The apparatus of claim 15, wherein the processor is configured to select a subset of the other direct clients based on relative locations of the direct client and the other clients.

21. One or more non-transitory computer readable storage media encoded with software comprising computer executable instructions and when the software is executed operable to:
monitor transmissions sent by direct clients capable of forming ad hoc networks with one or more other direct clients in a wireless network;

store profile data for each detected direct client, the profile data indicating device type, a location, and services of the direct client;

receive from a direct client a request for information concerning one or more other direct clients that are neighbors of the direct client from which the request is received, and for a particular service desired by the direct client;

compile a list and associated data indicating device type and services of the other direct clients based on the profile data, wherein the instructions operable to compile include instructions operable to select a subset of the other direct clients based on the locations of the the other direct clients stored in the profile data and whether the other direct clients offer a particular service desired by the direct client;

generate, in response to a request from a direct client, information concerning one or more other direct clients that are neighbors of the direct client including the list of the subset of the other direct clients;

cause a wake-up message to be sent to one of the other direct clients that provides the particular service; and cause a message to be sent to the direct client indicating a time when the one of the other direct clients is expected to be awake and on what channel the other direct client will be awake.

22. The computer readable storage media of claim 21 further comprising instructions operable to generate a message to be sent to a particular one of the other direct clients, the message indicating to the particular direct client that the direct client is seeking ad hoc network connectivity with the particular direct client.

23. The computer readable storage media of claim 21, wherein:

the instructions operable to store comprise instructions operable to store for each detected client a peer-to-peer interface address that is not a media access control (MAC) address; and the instructions operable to select comprise instructions operable to resolve any direct client identity ambiguities based on the corresponding stored peer-to-peer interface addresses that are not MAC addresses.

24. The computer readable storage media of claim of claim 21, further comprising instructions operable to delete existing stored profile data for the direct client if transmission from the direct client has not been detected for a predetermined period of time.

25. The computer readable storage media of claim 24, wherein the instructions operable to store comprise instructions operable to store profile data comprising device type, device name, one or more peer-to-peer addresses, services offered, peer-to-peer group information, and time last detected.

* * * * *

UNITED STATES PATENT AND TRADEMARK OFFICE
CERTIFICATE OF CORRECTION

| | | |
|---|---|---|
| PATENT NO. | : 8,982,785 B2 | Page 1 of 1 |
| APPLICATION NO. | : 13/227624 | |
| DATED | : March 17, 2015 | |
| INVENTOR(S) | : Pandey et al. | |

It is certified that error appears in the above-identified patent and that said Letters Patent is hereby corrected as shown below:

In the claims

In Column 10, Line 16, delete "particular service desired by the direct client; and"

In Column 10, Line 18, after "offer a" insert --particular service desired by the direct client; and--

In Column 11, Line 13, change "the the" to --the direct client and the--

Signed and Sealed this
Eighth Day of March, 2016

Michelle K. Lee
*Director of the United States Patent and Trademark Office*